Sept. 18, 1956

K. N. FROMM ET AL

TRI-COLOR TELEVISION PICTURE TUBE
WITH REGISTRATION CONTROL

Filed Feb. 26, 1952

2,763,715

WITNESSES:
E. A. McGloskey
Manus W. Dodd

INVENTORS
Theodore Miller
and Kenneth N. Fromm.
BY
F. E. Browder
ATTORNEY 2,763,715

TRI-COLOR TELEVISION PICTURE TUBE WITH REGISTRATION CONTROL

Kenneth N. Fromm, Fort Wayne, Ind., and Theadore Miller, South Gate, Calif., assignors to Westinghouse Electric Corporation, East Pittsburgh, Pa., a corporation of Pennsylvania Application February 26, 1952, Serial No. 273,464

7 Claims. (Cl. 178—5.4)

Our invention relates to television picture reproduction apparatus and, more particularly, to means for reproducing color television pictures. Our invention relates to the same subject matter as the application of K. N. Fromm, Serial No. 267,608, filed January 22, 1952 (W. E. Case 27,246).

In accordance with the prior art of which we are aware, television tubes have been built employing phosphor screens having a plurality of strips of phosphor material, successive strips of which are capable of emitting different colored light when bombarded by a beam of electrons. The phosphor strips are scanned with an electron beam so as to produce a picture. Impressed on the electron beam are potentials corresponding to intensity of light of each color on the different parts of the screen being viewed. It is, therefore, necessary that careful co-ordination of registration be maintained between the transmitting screen and the receiving screen. It is necessary that the scanning continue in a regular manner and that the scanning beam be directed at a red phosphor strip, when red information is being received. Since successive phosphor strips are very close together, it would be very easy, without special controls, for the entire picture to be shifted upward or downward by the width of one phosphor strip. Normally, in a black and white receiver, such a shift in location of the picture would be of little consequence. However, in a color television receiver such a shift could produce red water and blue leaves which, of course, would not appeal to the viewer. It is, therefore, desirable that some type of sensing signal be obtained from the screen of the receiver which may be used to control the vertical deflection of the scanning beam.

It is accordingly an object of our invention to produce an improved color television system.

Another object of our invention is to provide improved means for obtaining a sensing signal from a color television tube.

An ancillary object of our invention is to provide means for obtaining a sensing signal which will indicate whether the scanning beam is too high or whether it is too low.

Another ancillary object of our invention is to provide a new and novel electronic apparatus.

The novel features which we consider characteristic of our invention are set forth with more particularity in the appended claims. The invention, however, with respect to both the organization and the operation thereof, together with other objects and advantages may be best understood from the following description of specific embodiments when read in connection with the accompanying drawing, in which:

Figures 1, 2:
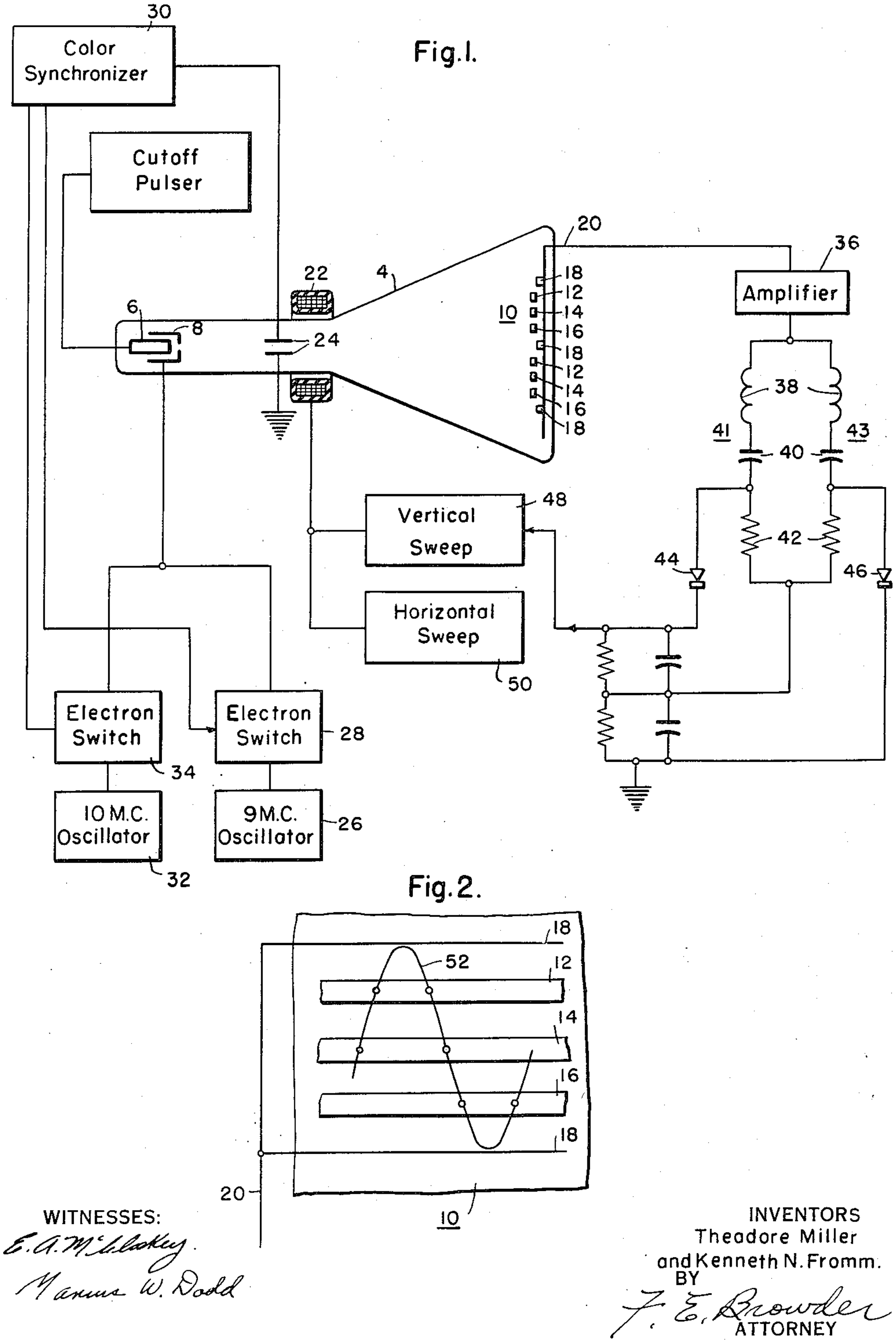
Figure 1 is a schematic showing of an apparatus embodying our invention.
Fig. 2 is a schematic showing of a section of the screen of the tube shown in Fig. 1 with a portion of the trace of the scanning beam superimposed thereon.

In accordance with our invention, we provide a glass envelope 4 having a large diameter at one end and a relatively smaller diameter at the other end. An electron gun 6 having a grid 8 is placed inside the tube near the small end of the tube. An electron gun is a device well known in the art for producing a beam of relatively high velocity electrons. In the large end of the envelope 4, parallel to the surface of the envelope at that end, there is a picture screen 10 comprising a plurality of phosphor strips 12, 14, 16 extending thereacross. These phosphor strips comprise three groups each group being capable of producing in response to electron bombardment different colors of light. Preferably a first group 12 should produce red light, a second group 14 should produce green light and a third group 16 should produce blue light. These strips are arranged on the screen in a regular rotating order, as follows: Red, green, blue, red, green . . . . Arranged periodically after each series of three phosphor strips preferably between the red and blue phosphor strips 12, 16, there is a strip of conducting material 18. The conducting strips 18 extend across the screen in a direction parallel to the phosphor strips 12, 14, 16. Near the end of the conducting strips 18 at one side of the screen, they are connected together so that the currents received by all of the conducting strips 18 may be transmitted over a common conductor 20.

The screen may be constructed by coating strips of phosphor material and conducting material on a supporting sheet such as glass. However, the preferred construction employs a large sheet of transparent conducting material with phosphor strips coated thereon. By leaving strips of the conducting material exposed to the electron beam the same effect is produced as occurs when separate conducting strips are coated on a dielectric material.

Between the electron gun 6 and the screen 10, there is a deflection coil 22 which encircles the tube envelope 4. The deflection coil 22 is so chosen and so oriented that it will, by means of a magnetic field, cause the electron beam produced by the electron gun 6 to scan the screen 10. While we have shown a magnetic deflection coil 22, it is, of course, understood that horizontal and vertical deflection electrodes might be employed in accordance with the broader aspects of our invention.

A pair of secondary deflection electrodes 24 are provided in the region between the electron gun 6 and the screen 10 for producing a low frequency sine wave deflection modulation of the electron beam.

A 9 megacycle oscillator 26 is connected through a first electron switch 28 to the control electrode 8 so that a 9 megacycle low amplitude intensity modulation may be impressed on the control grid during one portion of the sinusoidal scanning cycle. A 10 megacycle oscillator 32 is connected through an electron switch 34 to the grid of the electron gun for impressing a 10 megacycle intensity modulation on the electron beam during a second portion of the sinusoidal scanning cycle. The electron switches 28, 34 are controlled by the color synchronizing circuit 30 in the receiver in such time phase that the electron beam is modulated with a 10 megacycle intensity modulation at a first part of the color cycle and with a 9 megacycle intensity modulation during the second part of the color cycle.

The conducting strips 18 on the phosphor screen are connected to an amplifier 36. The output of the amplifier 36 is connected to a symmetrical circuit comprising two series circuits 41, 43 each having an inductance 38, a capacitance 40 and a resistance 42. One of these series circuits 41 is tuned for 10 megacycles and the second series circuit 43 is tuned for 9 megacycles. The two series circuits are connected in parallel and poined together at their extremities. A first rectifier 44 is connected between the capacitance 40 and the resistance 42 of one of said series circuits and a second rectifier 46 is connected between the capacitance 40 and resistance 42 of the other of said series circuits. The output of the first rectifier 44 is connected through a resistance and capacitance in parallel to the extremity of said first-mentioned parallel circuit at a point on said circuit which is opposite the end where said amplifier is connected and then through another resistance and capacitance in parallel to the output of the second rectifier 46. The second rectifier output 46 is also connected to ground and the output of the first rectifier 44 is also connected to a vertical sweep control circuit 48. A horizontal sweep control circuit 50 is connected, together with the vertical sweep control circuit 48, to the main deflection coil 22.

In the operation of the apparatus shown in the drawing, a sinusoidal scanning deflection velocity component is applied to the electron beam so that the electron beam scans across the screen so as to produce a trace 52 in the form of a sine wave. The electron beam trace 52 has an amplitude such that its trace on the screen during one horizontal scanning can lie between two successive conducting strips without contacting either and yet crossing all three conducting strips during each cycle of the sine wave trace. The scanning trace 52 is shown in detail in Fig. 2.

Impressed on the scanning beam is a high frequency low amplitude intensity modulation for producing a sensing signal. The high frequency low amplitude intensity modulation is co-ordinated with the received color synchronization signals so that during one-half of a scanning cycle, a 9 megacycle low amplitude intensity modulation is impressed on the main scanning cycle and during another half of the scanning cycle a 10 megacycle low amplitude intensity modulation is impressed on the main scanning cycle.

Let us assume that the 9 megacycle amplitude signal is being applied to the upper half of the scanning cycle and the 10 megacycle low amplitude signal is being applied to the lower half of the scanning cycle. If the apparatus is operating properly, the sinusoidal trace 52 of the electron beam on the picture screen 10 will lie between two successive conducting strips 18 without contacting either of these conducting strips. If, however, the scanning trace should leave the desired course, and scan an area slightly higher than that desired, the beam trace will cross the upper conducting strip of the two conducting strips bounding the region under discussion. The upper half of the scanning cycle 52 will then be in contact with a conducting strip 18 and the lower half of the scanning cycle will not be in contact with a conducting strip. A high frequency low amplitude signal will, therefore, be applied to the upper conducting strip which will be of a frequency of 9 megacycles. Since the series circuit to which the second rectifier 46 is connected is tuned for 9 megacycles, a potential is applied to the second rectifier 46. Since the series circuit connected to the first rectifier 44 is tuned for 10 megacycles, no signal will be applied to the first rectifier 44. Therefore, the output of the second rectifier 46 will be positive with respect to the output of the first rectifier 44 and a negative potential will be applied to the vertical sweep circuit.

If on the other hand the sinusoidal trace 52 should move downward and contact the lower conducting strip bounding the region being traced a 10 megacycle signal will be transmitted through the amplifier 36. The 10 megacycle signal will cause the output of the first rectifier 44 to be positive with respect to the output of the second rectifier 46 and, therefore, a positive signal will be applied to the vertical sweep circuit 48. These positive and negative signals applied to the vertical sweep circuit 48 cause corrections in the vertical deflections impressed on the electron beam so as to cause that beam to again scan the desired portion of the screen.

While we have described an apparatus employing an intensity modulation of the electron beam for producing the sensing signal, nevertheless in accordance with the broader aspects of our invention it might be desirable in some circumstances to employ low amplitude high frequency deflection modulations applied in a manner similar to the manner described above for applying the intensity modulations.

Although we have shown and described specific embodiments of our invention, we are aware that other modifications thereof are possible. Our invention, therefore, is not to be restricted except insofar as is necessitated by the prior art and the spirit of the invention.

We claim as our invention:

1. In combination, an envelope of transparent material, an electron gun located therein near a first end of said envelope for producing an electron beam, a phosphor screen located near a second end of said envelope opposite said first end, a plurality of phosphor strips located on said screen, some of said phosphor strips being capable of emitting light of a different frequency than that emitted by other of said phosphor strips, a plurality of strips of electrically conducting material interspersed periodically among said phosphor strips, deflection means capable of producing a low frequency sinusoidal deflection of electrons emitted by said electron gun in accordance with received control signals, secondary electrodes for applying a high frequency low amplitude field to said electron beam in a direction parallel to the path of said electron beam, and means connected electrically to said conducting strips capable of responding to the high frequency signal impressed on the electron beam by the secondary electrodes.

2. In combination, an envelope of dielectric material, an electron gun located inside said envelope near one end of said envelope for producing a beam of electrons, a phosphor screen located inside said envelope near the opposite end of said envelope from said electron gun, said screen comprising a plurality of strips of a first phosphor material, a second phosphor material and a third phosphor material capable of emitting light of a first, a second, and a third wave length, respectively, a plurality of strips of conducting material parallel to and interspersed among said phosphor strips, said phosphor strips and said conducting strips being arranged in the following order, a conducting strip, a first phosphor strip, a second phosphor strip, a third phosphor strip, a conducting strip, a current responsive circuit connected to said conducting strips for responding to currents produced by said electron beam on impingement on said conducting strips, and means located between said gun and said screen for applying a high frequency low amplitude intensity variation field to said electron beam, said current responsive circuit capable of responding to the high frequency low amplitude current produced by said electron beam in the region of one of said conducting strips.

3. A color television tube comprising an envelope having therein a phosphor screen, said screen comprising a plurality of strips of a first phosphor material, a second phosphor material and a third phosphor material capable of respectively emitting light of a first, second and third wave lengths, a plurality of strips of conducting material parallel to and interspersed among said phosphor strips, said phosphor strips and said conducting strips being arranged in the following order, a conducting strip, said first phosphor strip, said second phosphor strip, said third phosphor strip, a conducting strip, means for deflecting said electron beam to linearly scan a raster on said phosphor screen, auxiliary deflection means for sinusoidally varying said linear scan, a current responsive circuit connected to said conducting strips for responding to predetermined signals produced by said electron beam on impingement on said conducting strips, and means providing for modulating the intensity of said electron beam with a first frequency while it is scanning one half of each cycle of said sinusoidal line scan and modulating the electron beam intensity with a second frequency when it is scanning the second half of each cycle, and means connected to said current responsive circuit capable of producing separate responses from said first and second frequency.

4. In combination, a color television tube comprising an envelope having an end thereof transparent to light, a screen located near said transparent end and substantially parallel thereto, means for producing a beam of electrons located inside said tube in the opposite end of said tube from said screen, said screen comprising a plurality of phosphor strips and a plurality of conducting strips interspersed among said phosphor strips, the strips on said screen arranged so that a plurality of phosphor strips are located between each two successive conducting strips, some of said phosphor strips being capable of emitting light of a first frequency and some of said phosphor strips being capable of emitting light of a second frequency, deflection means located about said electron beam in the region between said electron gun and said screen for causing said beam to scan said screen in a sinusoidal line, electrodes capable of producing a high frequency low amplitude intensity variation of a first frequency in said electron beam while it is scanning one half of each cycle of said sinusoidal line and capable of supplying a high frequency low amplitude intensity variation of a second frequency to said electron beam when it is scanning said sinusoidal line during a second portion of each cycle, means connected to said conducting strips capable of producing a response of a first type to currents of a frequency of said first frequency and capable of producing a different response to currents of a frequency corresponding to said second frequency.

5. In combination, a television tube comprising an envelope having an end thereof transparent to light, a phosphor screen located near said transparent end, a plurality of strips of conducting material extending across said screen, a plurality of strips of phosphor materials capable of producing a plurality of different colors of light located between successive conducting strips, means for producing a beam of electrons and means for causing said beam of electrons to scan said screen with a large amplitude sinusoidal deflection with a first low amplitude intensity modulation impressed on said beam during a first portion of each sinusoidal cycle and a second low amplitude intensity modulation of a second frequency superimposed on said beam during a second portion of each sinusoidal cycle, responsive means connected to said conducting strips capable of producing a current of a first type in response to currents of a frequency equal to said first low amplitude intensity modulation frequency and capable of producing a current of a second type in response to currents of a frequency equal to said second low amplitude intensity modulation frequency.

6. In combination, a color television tube comprising an envelope having therein a phosphor screen, a plurality of strips of conducting material extending across said screen, a plurality of strips of phosphor materials capable of producing a plurality of different frequencies of light located between successive conducting strips, means for producing a beam of electrons and means for causing said beam of electrons to scan said screen with a large amplitude sinusoidal deflection with a first high frequency low amplitude modulation impressed on said beam during a first portion of each sinusoidal cycle and a second high frequency low amplitude modulation of a second frequency impressed on said beam during a second portion of each sinusoidal cycle, responsive means connected to said conducting strips capable of producing a current of a first type in response to currents of a frequency equal to said first low amplitude modulation frequency and capable of producing a current of a second type in response to currents of a frequency equal to said second low amplitude modulation frequency.

7. Apparatus substantially as described in claim 3 characterized in that the amplitude of said sinusoidal variation in said linear scan is substantially equal to the width of said first, second and third phosphor strips.

References Cited in the file of this patent

UNITED STATES PATENTS

| | | |
|---|---|---|
| 2,415,059 | Zworykin | Jan. 28, 1947 |
| 2,431,115 | Goldsmith | Nov. 18, 1947 |
| 2,490,812 | Huffman | Dec. 13, 1949 |
| 2,530,431 | Huffman | Nov. 21, 1950 |
| 2,545,325 | Weimer | Mar. 13, 1951 |
| 2,587,074 | Sziklai | Feb. 26, 1952 |
| 2,617,876 | Rose | Nov. 11, 1952 |
| 2,634,326 | Goodrich | Apr. 7, 1953 |
| 2,648,722 | Bradley | Aug. 11, 1953 |
| 2,650,264 | Weimer | Aug. 25, 1953 |
| 2,657,257 | Lesti | Oct. 27, 1953 |
| 2,677,723 | McCoy | May 4, 1954 |